United States Patent [19]

Rath

[11] Patent Number: 4,491,205
[45] Date of Patent: Jan. 1, 1985

[54] ADJUSTABLE ABUTMENTS IN DISC BRAKES

[75] Inventor: Heinrich B. Rath, Vallendar, Fed. Rep. of Germany

[73] Assignee: Lucas Industries Limited, Birmingham, England

[21] Appl. No.: 401,559

[22] Filed: Jul. 26, 1982

Related U.S. Application Data

[63] Continuation of Ser. No. 154,799, May 30, 1980, abandoned.

[30] Foreign Application Priority Data

Jun. 16, 1979 [GB] United Kingdom ............... 7920929

[51] Int. Cl.$^3$ .................................. F16D 55/224
[52] U.S. Cl. ......................... 188/73.39; 188/73.32; 188/73.45
[58] Field of Search ............. 188/73.31, 73.32, 73.39, 188/73.43, 73.45, 71.1, 205 R

[56] References Cited

U.S. PATENT DOCUMENTS 2,942,695  6/1960  Butler .......................... 188/73.32
3,905,455  9/1975  Martins ........................ 188/73.43
3,999,635  12/1976  Hotchkiss .................... 188/73.43 X
4,074,795  2/1978  Kondo et al. ................ 188/73.45 X
4,171,035  10/1979  Takaaki ....................... 188/73.45

FOREIGN PATENT DOCUMENTS 2326620  4/1977  France ........................ 188/73.45
2041124  9/1980  United Kingdom ....... 188/73.45

Primary Examiner—Douglas C. Butler
Attorney, Agent, or Firm—Scrivener, Clarke, Scrivener and Johnson

[57] ABSTRACT

The present specification describes and claims a spot-type disc brake comprising a caliper and a torque taking member, a pair of abutment members being mounted on the torque taking member to form guides for an inboard friction pad assembly, one abutment member being secured in a fixed position and the other abutment member being adjustable in position to a limited extent. This arrangement is particularly applicable to twin-pin sliding caliper disc brakes wherein the same pinch bolts secure both the abutment members and the pins upon which the caliper is slidably mounted, to the torque taking member.

9 Claims, 8 Drawing Figures

ADJUSTABLE ABUTMENTS IN DISC BRAKES

This application is a continuation, of application Ser. No. 154,799, filed May 30, 1980 now abandoned.

DESCRIPTION

The present invention relates to a spot-type disc brake, and in particular to a twin-pin sliding caliper disc brake.

Such twin-pin sliding caliper disc brakes basically comprises a torque taking member and a caliper which is slidable by means of a two pin connection, relative to the torque taking member. The caliper member carries hydraulic and/or mechanical means which, when actuated, cause friction pad assemblies to engage and grip one each side of a disc.

When the brake is applied the drag force from both of the friction pad assemblies can either be taken solely by the torque taking member, or the outboard pad drag is taken through the caliper member to the pins and the inboard pad drag is taken directly on the torque taking member, or the total pad drag is taken by both pins via the caliper member. Taking the case where inboard pad drag is taken directly by the torque taking member, abutment faces are provided on the torque taking member in certain such disc brakes, to guide the inboard friction pad assembly during movement towards and away from the disc. If the friction pad assembly is mounted between the abutment members with clearance, it has been found that if the clearance is small seizure of the friction pad assembly within the abutments could occur. Conversely, if the distance chosen between the abutments results in a large clearance between the abutment faces and the friction pad assembly, then rattle of the friction pad assembly within the abutments could result. Whilst rattle is clearly undesirable the effects of seizure can be actually dangerous. Seizure can cause dragging of the friction pad assembly on the disc and if dragging occurs in one brake alone, then unbalanced braking can occur and could result in instability of the vehicle.

An aim of the present invention is to enable the optimum dimension to be provided between friction pad abutment faces so that seizure and rattle are substantially obviated.

According to the present invention there is provided a spot-type disc brake comprising a caliper and a torque taking member, a pair of abutment members being mounted on the torque taking member to form guides for an inboard fraction pad assembly, one abutment member being secured in a fixed position and the other abutment member being adjustable in position to a limited extent.

According to a further aspect of the present invention there is provided a twin-pin sliding caliper disc brake comprising a caliper and a torque taking member, a pair of abutment members being mounted on the torque taking member to form guides for an inboard friction pad assembly, one abutment member being secured in a fixed position and the other abutment member being adjustable in position to a limited extent.

The said one abutment member is keyed or mechanically interlocked with the torque taking member and is preferably the abutment member which takes the main drag during braking in the forward direction of the vehicle. The other abutment member being adjustable, the distance between the abutment members i.e. between the abutment members and the inboard friction pad assembly, can be accurately adjusted during installation or servicing of the brake to achieve the optimum position for the abutment members and substantially obviate seizure or rattle.

In one embodiment of the present invention two pinch bolts extend through the torque taking member and secure two pins to the torque taking member, the caliper being slidably mounted on these pins. The pinch bolts also secure two abutment members to the torque taking member. One pinch bolt is a snug fit in a bore in one abutment member and the pin secured to this pinch bolt is mechanically interlocked with the torque taking member. Thus the said one abutment member is immovably fixed in position. The other pinch bolt passes with clearance, through a bore in the other abutment member so that the secured position of this other abutment member can be adjusted to a limited extent to provide the optimum spacing between the abutment members.

In another embodiment of the present invention two pinch bolts extend through the torque taking member, one pinch bolt being screwed into a bore in the torque taking member and having an axial extension which forms a pin, and the other pinch bolt securing a pin to the torque taking plate as in the previous embodiment. The caliper is slidably mounted on the pins. The pinch bolts also secure two abutment members to the torque taking member. Said one pinch bolt is a snug fit in a bore through one abutment member so that this abutment member is immovably fixed in position. The other pinch bolt, however, passes with clearance through a bore in the other abutment member so that the secured position of this other abutment member can be adjusted.

In a still further embodiment of the present invention two abutment members are provided, each having a threaded bore extending therethrough. Pins which in use slidably support a caliper, are formed by sleeves through which bolts extend with clearance. The bolts pass through apertures in the torque taking member and are screwed into the bores in the abutment members. The sleeves are thus held between the bolt heads and the torque taking members. One abutment member has an extension which engages in a recess in the torque taking member so that this abutment member is keyed to the torque taking member. However, the other abutment member may be adjusted in position by virtue of the clearances between the bolt and the sleeve and between the bolt and the aperture in the torque taking member.

The present invention will now be further described by way of example, with reference to the accompanying drawings, in which.

Figure 1:
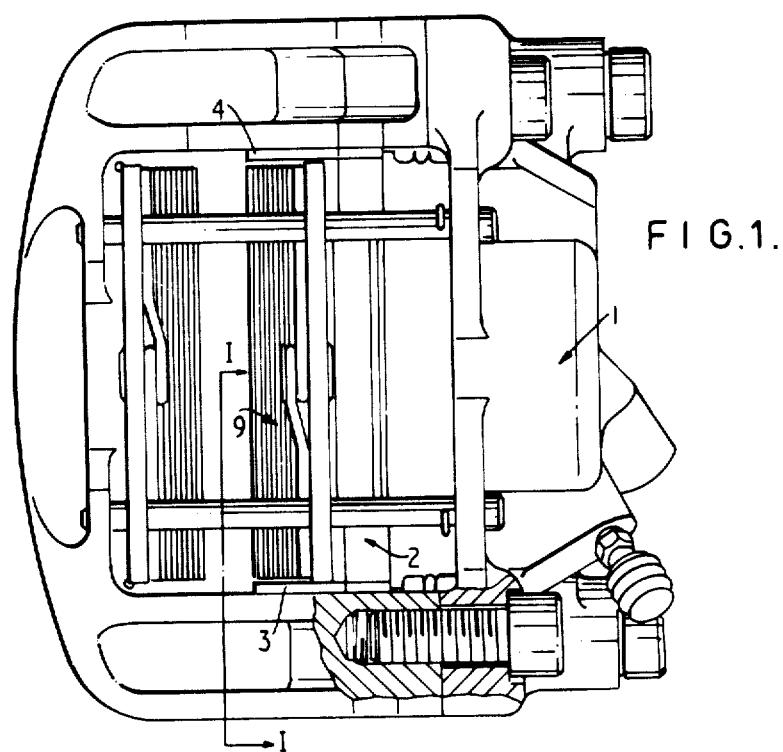
FIG. 1 is a plan view of on embodiment of a brake according to the present invention.
Figure 2:
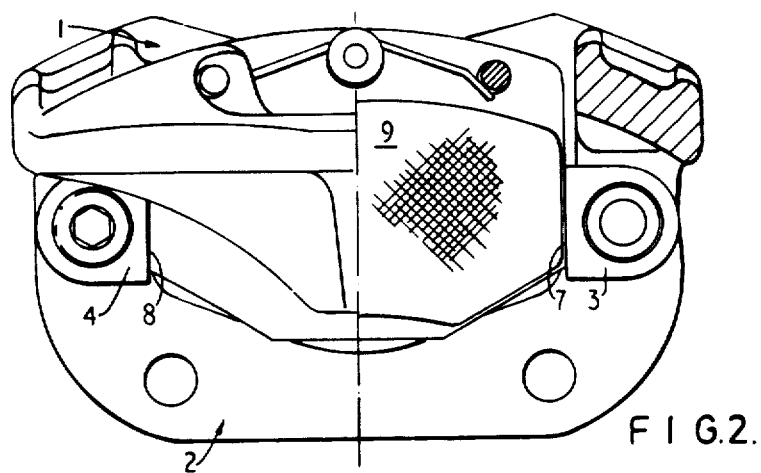
FIG. 2 is an end view of the embodiment of FIG. 1, partially cutaway along line I—I in FIG. 1.
Figures 3A, 3B:
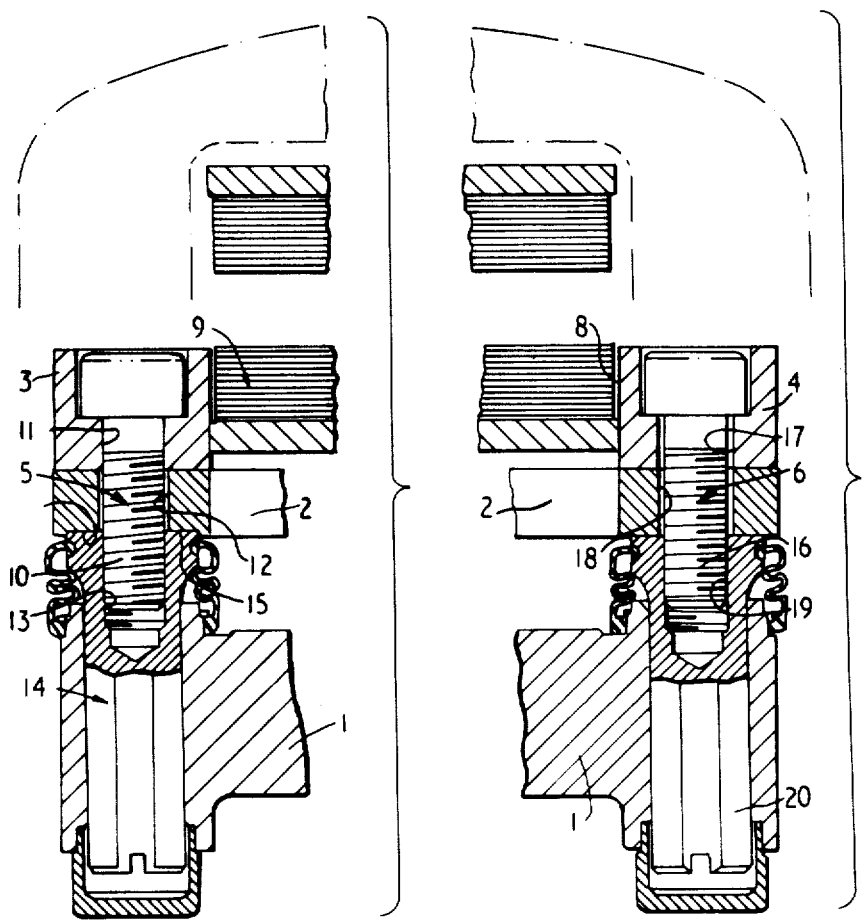
FIGS. 3a and 3b are horizontal cross-sectional views of the respective right and left hand parts of the brake shown in FIG. 1.
Figures 4A, 4B:
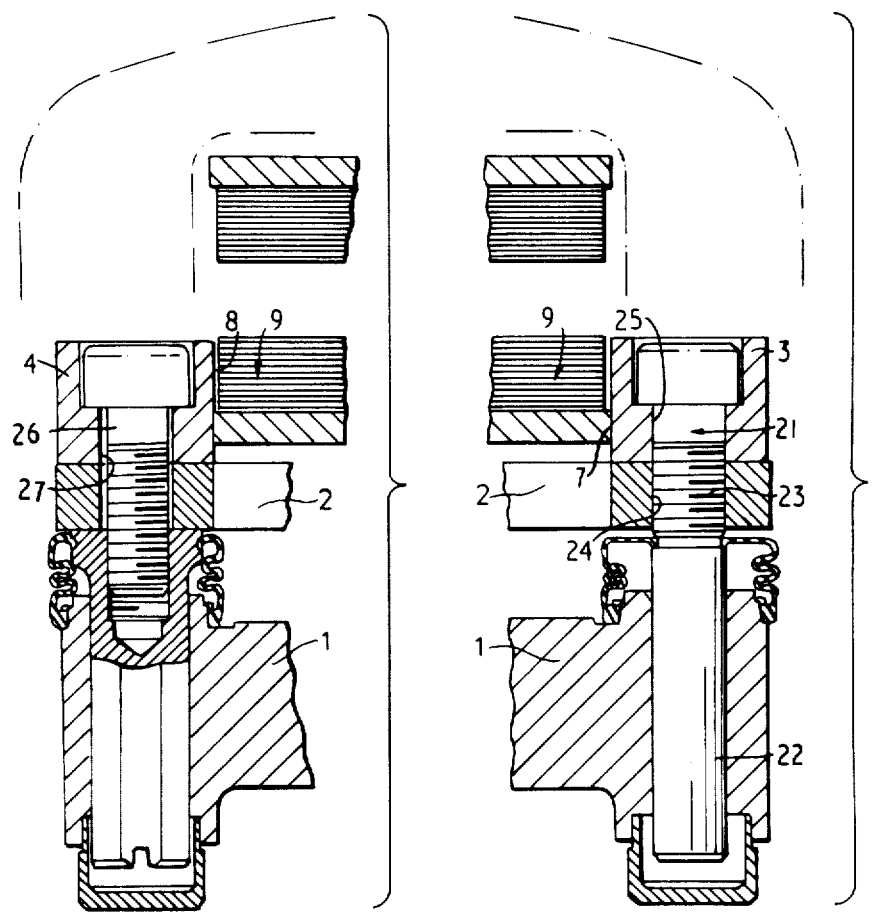
Figures 5A, 5B:
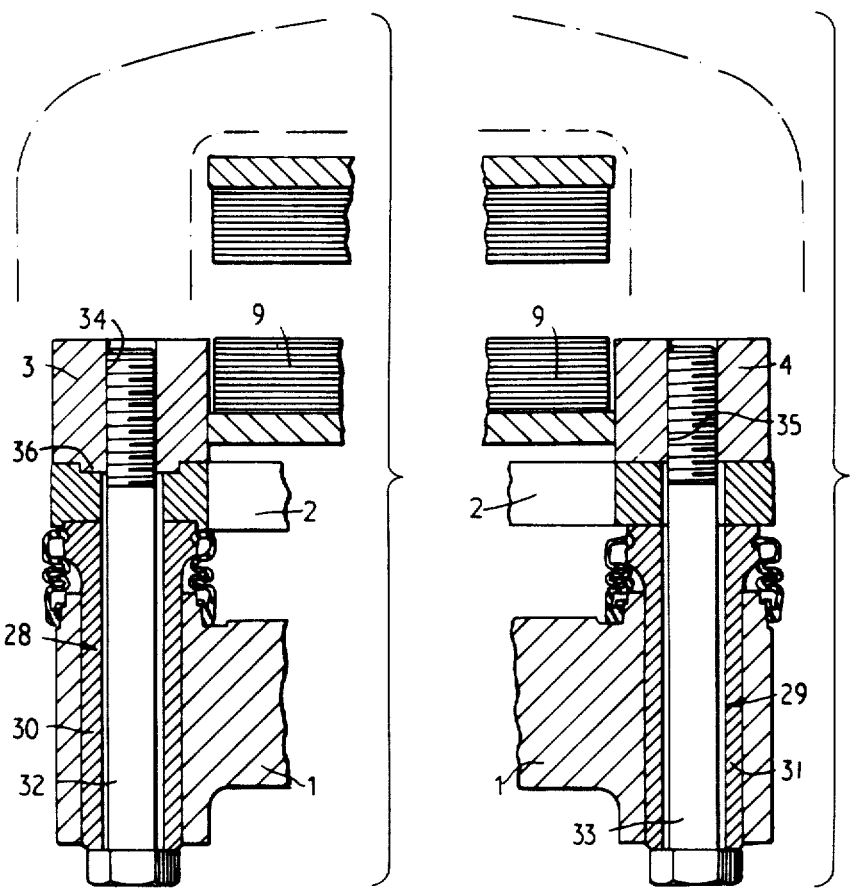

FIGS. 4a and 4b are cross-sectional views similar to FIGS. 3a, 3b, of another embodiment of the present invention; and FIGS. 5a and 5b are cross-sectional views similar to FIGS. 3a and 3b, of a still further embodiment of the present invention.

The embodiment of the present invention shown in FIGS. 1, 2, 3a and 3b of the accompanying drawings basically comprises a caliper generally designated 1 and a torque plate 2. Abutment members 3 and 4 are secured to the torque plate 2 by pinch bolts 5 and 6 respectively, and present parallel faces 7 and 8 respectively, which act as guides for inboard friction pad assembly 9 during its operative movement. The shaft 10 of pinch bolt 5 is a snug fit in bore 11 extending through abutment member 3, and passes with clearance through aperture 12 in torque plate 2 to be screwed into axial blind bore 13 in pin 14. Pin 14 engages in recess 15 in the torque plate to thus secure both the pinch bolt 5 and pin 14 in a fixed position, the snug fit of shaft 10 in the abutment member ensuring a fixed, unadjustable position for abutment member 3. The shaft 15 of pinch bolt 6 passes with clearance through both bore 17 in abutment member 4, and aperture 18 in torque plate 2, and is screwed into axial blind bore 19 in pin 20. Pins 14 and 20 slidably support caliper 1 in the complete brake. Purely the clamping action of pinch bolt 6 secures the position of abutment member 4 and pin 20. By slackening pinch bolt 6 the clearance between abutment member 4 and shaft 16, and between shaft 16 and aperture 18, can be utilised to adjust the position of the abutment member 4 relative to fixed abutment member 3.

In the embodiments shown in part in FIGS. 4a and 4b and 5a and 5b, parts common to FIGS. 3a and 3b are identified by the same reference numerals.

In FIG. 4b a pinch bolt 21 has an axial extension which forms a pin 22 upon which the caliper 1 is mounted. The shaft of pinch bolt 21 has a threaded portion 23 which is screwed into a complementary threaded bore 24 in torque plate 2, the pinch bolt being thus fixedly secured in position relative to torque plate 2. Due to the snug fit of the pinch bolt 21 in bore 25 in abutment member 3, the abutment member 3 is therefore unadjustably fixed in position. However as can be seen in FIG. 4a pinch bolt 26 passes with clearance through the bore 27 in abutment member 4 so that the position of abutment member 4 can be adjusted, upon slackening pinch bolt 26. Thus the distance between opposing faces 7 and 8 of the abutment members can be adjusted to substantially obviate the problems of seizure and rattle.

In the embodiment of FIGS. 5a and 5b, pins 28 and 29 upon which caliper 1 is slidably mounted, are formed by sleeves 30 and 31 respectively, which are secured to torque plate 2 by bolts 32 and 33 respectively. The bolts 32 and 33 extend through apertures in torque plate 2 and are screwed into threded bores 34 and 35 in the abutment members 3 and 4. Thus by the clamping action of bolts 32 and 33 the pins 28 and 29, and abutment members 3 and 4 are held in place. Abutment member 3 has an extension 36 which engages in a complimentary recess in torque plate 2 so that abutment member 3 is accurately and fixedly secured in position. However, bolt 33 extends with clearance through sleeve 31 and with clearance through the aperture in the torque plate 2. Thus, as abutment member 4 has a planar surface in contact with the planar surface of the torque plate 2, abutment member 4 can be adjusted in position once bolt 33 has been slackened, utilising the abovementioned clearances.

In all of the above described embodiments of the present invention, which are merely examples of the large number of embodiments possible within the scope of the present invention, one abutment member is fixed and the other abutment member is adjustable. Thus, during servicing or installation the adjustment of the one abutment member can provide the optimum spacing of the abutment members to substantially obviate the problems of rattle or seizure.

I claim:

1. A disc brake comprising a caliper and a torque taking member, a pair of separate abutment members on one side of said torque taking member to form guides for an inboard friction pad assembly, a pair of bolt means passing through said torque taking member and engaging said abutment members to clamp same against said one side of said torque taking member, pins secured by said bolt means to the side of said torque taking member opposite said abutment members for slidably connecting said caliper to said torque taking member, at least one of said abutment members and its bolt means being laterally adjustable to a certain extent relative to said torque taking member and to said other abutment member.

2. A disc brake according to claim 1, wherein said bolt means are pinch bolts, one pinch bolt passing with clearance through a bore in said at least one abutment member.

3. A disc brake according to claim 2, wherein the other of said pinch bolts is a snug fit in a bore in one of said abutment members and the pin secured to said other pinch bolt is mechanically interlocked with the torque taking member.

4. A disc brake according to claim 3, wherein the pin secured to said other pinch bolt is mechanically interlocked with the torque taking member by one end of said pin engaging in a complementary recess in the torque taking member and being clamped therein by means of said one pinch bolt.

5. A disc brake according to claim 2, wherein the other of said pinch bolts has an axial extension which forms said pin upon which the caliper can slide, and a threaded region which engages in a complementary threaded through bore in the torque taking member, another pin for slidably supporting the caliper being secured to the torque taking member by the said one pinch bolt.

6. A disc brake according to claim 1, wherein each abutment member has a threaded bore extending therethrough said pins which slidably connect the caliper being formed by sleeves through which said bolt means extend with clearance, the bolt means passing through apertures in the torque taking member and being screwed into said bores in the abutment members, said at least one abutment member being adjustable due to the bolt means secured thereto passing with clearance through its aperture in the torque taking member and said other abutment member being secured in a fixed position.

7. A disc brake according to claim 6, wherein said other abutment member is secured in a fixed position to the torque taking member by an extension thereof engaging in a complementary recess in the torque taking member.

8. A disc brake according to claims 6 or 7, wherein the bolt engaging said other abutment member is a snug fit in the bore through which it passes in the torque taking member.

9. A disc brake according to claims 6 or 7, wherein the sleeve through which the bolt secured to said other abutment member passes, engages in a complementary shaped recess in the torque taking member.

* * * * *